（12）United States Patent
Tammana et al.

US011792712B2

(10) Patent No.: US 11,792,712 B2
(45) Date of Patent: Oct. 17, 2023

(54) CELL RESELECTION PRIORITY ASSIGNMENT BASED ON PERFORMANCE TRIGGERS

(71) Applicant: T-Mobile USA, Inc., Bellevue, WA (US)

(72) Inventors: Deepak Nadh Tammana, Bothell, WA (US); Roopesh Kumar Polaganga, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 17/561,073

(22) Filed: Dec. 23, 2021

(65) Prior Publication Data
US 2023/0209433 A1    Jun. 29, 2023

(51) Int. Cl.
*H04W 36/00* (2009.01)
*H04W 36/30* (2009.01)

(52) U.S. Cl.
CPC ....... *H04W 36/30* (2013.01); *H04W 36/0077* (2013.01); *H04W 36/00837* (2018.08)

(58) Field of Classification Search
None
See application file for complete search history.

(56) References Cited

U.S. PATENT DOCUMENTS

| | | |
|---|---|---|
| 7,333,441 B2 | 2/2008 | Balletti et al. |
| 7,454,213 B2 | 11/2008 | Toelli |
| 8,000,706 B2 | 8/2011 | Lee et al. |
| 8,041,355 B2 | 10/2011 | Roberts et al. |
| 8,121,602 B2 | 2/2012 | Yi et al. |
| 8,140,876 B2 | 3/2012 | Arnold et al. |
| 8,229,432 B2 | 7/2012 | Fox et al. |
| 8,280,377 B2 | 10/2012 | Lee et al. |
| 8,364,156 B2 | 1/2013 | Chun et al. |
| 8,626,900 B2 | 1/2014 | Beattie, Jr. et al. |
| 8,688,166 B2 | 4/2014 | Gupta et al. |
| 8,837,399 B2 | 9/2014 | Jonsson et al. |
| 8,838,089 B2 | 9/2014 | Wu |
| 8,838,108 B2 | 9/2014 | Swaminathan et al. |
| 8,843,133 B2 | 9/2014 | Chen |

(Continued)

FOREIGN PATENT DOCUMENTS

| | | |
|---|---|---|
| CN | 101572924 B | 4/2013 |
| CN | 101931984 B | 6/2013 |

(Continued)

*Primary Examiner* — Suhail Khan
(74) *Attorney, Agent, or Firm* — Perkins Coie LLP (57) ABSTRACT

The disclosed technology provides systems and methods for dynamically assigning cell reselection priorities (e.g., system information block (SIB) priorities) to different layers (e.g., different frequency bands or different radio access technologies (RATs)) for radio cells experiencing performance degradation. In some implementations, default SIB priorities of degraded layers are downgraded based on the severity of the performance degradation, for example, set to the lowest variable SIB priority for critical performance degradations. The adjusted SIB priorities are broadcast to user equipment (UE) to allow the UEs to perform cell reselection based on the adjusted SIB priorities. When the performance degradation is resolved, the SIB priorities revert to the default SIB priorities.

18 Claims, 6 Drawing Sheets

(56) References Cited

U.S. PATENT DOCUMENTS

| | | |
|---|---|---|
| 8,886,184 B2 | 11/2014 | Cho et al. |
| 8,909,229 B2 | 12/2014 | Martin et al. |
| 8,929,897 B2 | 1/2015 | Martin et al. |
| 8,971,892 B2 | 3/2015 | Hole et al. |
| 9,001,737 B2 | 4/2015 | Amerga et al. |
| 9,014,688 B2 | 4/2015 | Katepalli et al. |
| 9,055,501 B2 | 6/2015 | Ekemark |
| 9,240,936 B2 | 1/2016 | Kanamarlapudi et al. |
| 9,294,714 B2 | 3/2016 | Gupta et al. |
| 9,332,470 B2 | 5/2016 | Won et al. |
| 9,338,684 B2 | 5/2016 | Zhi et al. |
| 9,357,461 B2 | 5/2016 | Jung et al. |
| 9,380,504 B2 | 6/2016 | Xing et al. |
| 9,408,116 B2 | 8/2016 | Pakniat et al. |
| 9,408,130 B1 | 8/2016 | Kotreka et al. |
| 9,432,927 B2 | 8/2016 | Kim et al. |
| 9,474,007 B2 | 10/2016 | Jung et al. |
| 9,479,988 B2 | 10/2016 | Kim et al. |
| 9,503,947 B2 | 11/2016 | Jung et al. |
| 9,503,950 B2 | 11/2016 | Krishnamurthy |
| 9,565,611 B2 | 2/2017 | Callender et al. |
| 9,615,321 B2 | 4/2017 | Pica et al. |
| 9,693,278 B2 | 6/2017 | Yiu et al. |
| 9,705,692 B2 | 7/2017 | Kim et al. |
| 9,713,048 B2 | 7/2017 | Jung et al. |
| 9,736,765 B2 | 8/2017 | Yiu et al. |
| 9,749,946 B2 | 8/2017 | Wang et al. |
| 9,769,792 B2 | 9/2017 | Koskinen |
| 9,820,206 B2 | 11/2017 | Abraham et al. |
| 9,823,298 B2 | 11/2017 | Balasubramanian et al. |
| 9,854,591 B2 | 12/2017 | Yiu et al. |
| 9,872,221 B2 | 1/2018 | Dahlen et al. |
| 9,900,815 B2 | 2/2018 | Jung et al. |
| 9,900,834 B2 | 2/2018 | Fan et al. |
| 9,913,184 B2 | 3/2018 | Jung et al. |
| 9,980,275 B2 | 5/2018 | Goel et al. |
| 10,064,128 B2 | 8/2018 | Yoon |
| 10,111,246 B2 | 10/2018 | Zhang et al. |
| 10,223,228 B2 | 3/2019 | Boss et al. |
| 10,306,531 B2 | 5/2019 | Xu et al. |
| 10,342,065 B2 | 7/2019 | Lee et al. |
| 10,433,244 B2 | 10/2019 | Song et al. |
| 10,440,603 B2 | 10/2019 | Nuss et al. |
| 10,470,196 B2 | 11/2019 | Johansson et al. |
| 10,524,169 B2 | 12/2019 | Kim et al. |
| 10,555,323 B2 | 2/2020 | Ma et al. |
| 10,673,541 B2 | 6/2020 | Nimmala et al. |
| 10,681,559 B2 | 6/2020 | Zhu et al. |
| 10,716,044 B2 | 7/2020 | Jain et al. |
| 10,756,858 B2 | 8/2020 | Tseng et al. |
| 10,757,622 B2 | 8/2020 | Srivastava et al. |
| 10,813,019 B2 | 10/2020 | Selvaganapathy et al. |
| 10,869,239 B2 | 12/2020 | Fan et al. |
| 10,892,879 B2 | 1/2021 | Zhang et al. |
| 10,893,448 B2 | 1/2021 | Panchal et al. |
| 10,904,811 B2 | 1/2021 | Fujishiro et al. |
| 11,006,336 B2 | 5/2021 | Zingler et al. |
| 11,026,120 B2 | 6/2021 | Khoryaev et al. |
| 11,102,694 B2 | 8/2021 | Yiu |
| 2008/0176565 A1 | 7/2008 | Eerolainen et al. |
| 2009/0270103 A1 | 10/2009 | Pani et al. |
| 2010/0113010 A1 | 5/2010 | Tenny et al. |
| 2010/0222060 A1 | 9/2010 | Zhang et al. |
| 2010/0329113 A1 | 12/2010 | Madan et al. |
| 2012/0115468 A1 | 5/2012 | Lindoff et al. |
| 2012/0252452 A1 | 10/2012 | Martin et al. |
| 2013/0142104 A1 | 6/2013 | Lee et al. |
| 2013/0272124 A1 | 10/2013 | Gupta |
| 2013/0303165 A1 | 11/2013 | Hole et al. |
| 2013/0337814 A1 | 12/2013 | Wong et al. |
| 2014/0146794 A1 | 5/2014 | Dalsgaard |
| 2014/0323131 A1* | 10/2014 | Yun ............... H04W 76/15 455/436 |
| 2014/0329529 A1 | 11/2014 | Jung et al. |
| 2015/0079989 A1 | 3/2015 | Tambaram Kailasam et al. |
| 2015/0139183 A1 | 5/2015 | Pradas et al. |
| 2015/0257056 A1 | 9/2015 | Yang et al. |
| 2015/0264613 A1 | 9/2015 | Gopal et al. |
| 2015/0289189 A1 | 10/2015 | Yang et al. |
| 2015/0304918 A1 | 10/2015 | Jung et al. |
| 2015/0350973 A1 | 12/2015 | Yang et al. |
| 2016/0073305 A1 | 3/2016 | Yang et al. |
| 2016/0119834 A1 | 4/2016 | Yang et al. |
| 2016/0127956 A1 | 5/2016 | Jujaray et al. |
| 2017/0303181 A1 | 10/2017 | Gupta et al. |
| 2019/0342783 A1 | 11/2019 | Kim et al. |
| 2020/0053821 A1 | 2/2020 | Shih et al. |
| 2020/0120547 A1 | 4/2020 | Han et al. |
| 2020/0128484 A1 | 4/2020 | Su et al. |
| 2020/0154324 A1 | 5/2020 | Ozturk et al. |
| 2020/0187073 A1 | 6/2020 | Ma et al. |
| 2020/0229261 A1 | 7/2020 | Jung et al. |
| 2020/0305039 A1 | 9/2020 | Jung |
| 2020/0314713 A1 | 10/2020 | Jung et al. |
| 2020/0322861 A1 | 10/2020 | Ozturk et al. |
| 2020/0359288 A1 | 11/2020 | Tang |
| 2021/0022056 A1 | 1/2021 | Lee et al. |
| 2021/0037433 A1 | 2/2021 | Lee et al. |
| 2021/0051579 A1 | 2/2021 | Luo et al. |
| 2021/0092621 A1 | 3/2021 | Shih et al. |
| 2021/0136606 A1 | 5/2021 | Jia et al. |
| 2021/0136675 A1 | 5/2021 | Lee et al. |
| 2021/0153087 A1 | 5/2021 | Lee et al. |
| 2021/0176674 A1 | 6/2021 | Jung et al. |
| 2021/0297911 A1 | 9/2021 | Jung et al. |

FOREIGN PATENT DOCUMENTS

| | | |
|---|---|---|
| CN | 101754384 B | 7/2013 |
| CN | 107277868 A | 10/2017 |
| CN | 108401272 A | 8/2018 |
| CN | 108886828 A | 11/2018 |
| CN | 106900033 B | 2/2020 |
| CN | 111314980 A | 6/2020 |
| CN | 109041145 B | 8/2020 |
| CN | 111587608 A | 8/2020 |
| CN | 111615160 A | 9/2020 |
| CN | 111641975 A | 9/2020 |
| CN | 111726844 A | 9/2020 |
| CN | 111866972 A | 10/2020 |
| CN | 110300439 B | 11/2020 |
| CN | 111988820 A | 11/2020 |
| CN | 111988867 A | 11/2020 |
| CN | 112020094 A | 12/2020 |
| CN | 112383928 A | 2/2021 |
| CN | 112423345 A | 2/2021 |
| CN | 112425205 A | 2/2021 |
| CN | 112543476 A | 3/2021 |
| CN | 110831078 B | 7/2021 |
| CN | 110831084 B | 9/2021 |
| DE | 102020119748 A1 | 2/2021 |
| EP | 2853116 A1 | 4/2015 |
| EP | 2883405 A2 | 6/2015 |
| EP | 2695446 B1 | 1/2017 |
| EP | 2645809 B1 | 2/2018 |
| EP | 3537769 A1 | 9/2019 |
| EP | 2880947 B1 | 11/2020 |
| JP | 5335783 B2 | 8/2013 |
| JP | 2013544477 A | 12/2013 |
| JP | 2016019114 A | 2/2016 |
| JP | 6935520 B2 | 8/2021 |
| KR | 20080026248 A | 3/2008 |
| KR | 20100071879 A | 6/2010 |
| KR | 20120011756 A | 2/2012 |
| KR | 20120011757 A | 2/2012 |
| KR | 101467793 B1 | 12/2014 |
| KR | 101677768 B1 | 11/2016 |
| KR | 20160135433 A | 11/2016 |
| KR | 101737376 B1 | 5/2017 |
| KR | 20170056864 A | 5/2017 |
| KR | 101790794 B1 | 10/2017 |
| WO | 2009129752 A1 | 10/2009 |
| WO | 2010076393 A1 | 7/2010 |
| WO | 2010121438 A1 | 10/2010 |

(56) References Cited

FOREIGN PATENT DOCUMENTS

| | | |
|---|---|---|
| WO | 2013086851 A1 | 6/2013 |
| WO | 2013156051 A1 | 10/2013 |
| WO | 2013170413 A1 | 11/2013 |
| WO | 2014012218 A1 | 1/2014 |
| WO | 2014012419 A1 | 1/2014 |
| WO | 2014101198 A1 | 7/2014 |
| WO | 2014101243 A1 | 7/2014 |
| WO | 2015183146 A1 | 12/2015 |
| WO | 2016033779 A1 | 3/2016 |
| WO | 2016173142 A1 | 11/2016 |
| WO | 2016182531 A1 | 11/2016 |
| WO | 2017011027 A1 | 1/2017 |
| WO | 2017028053 A1 | 2/2017 |
| WO | 2017107100 A1 | 6/2017 |
| WO | 2018018795 A1 | 2/2018 |
| WO | 2018040677 A1 | 3/2018 |
| WO | 2018063340 A1 | 4/2018 |
| WO | 2018171744 A1 | 9/2018 |
| WO | 2018227927 A1 | 12/2018 |
| WO | 2019192407 A1 | 10/2019 |
| WO | 2020117557 A1 | 6/2020 |
| WO | 2020153214 A1 | 7/2020 |
| WO | 2020156066 A1 | 8/2020 |
| WO | 2020167189 A1 | 8/2020 |
| WO | 2020192784 A1 | 10/2020 |
| WO | 2020211741 A1 | 10/2020 |
| WO | 2020216167 A1 | 10/2020 |
| WO | 2020228821 A1 | 11/2020 |
| WO | 2020239188 A1 | 12/2020 |
| WO | 2021027821 A1 | 2/2021 |
| WO | 2021028871 A1 | 2/2021 |
| WO | 2021042387 A1 | 3/2021 |
| WO | 2021049993 A1 | 3/2021 |
| WO | 2021138777 A1 | 7/2021 |

\* cited by examiner

CELL RESELECTION PRIORITY ASSIGNMENT BASED ON PERFORMANCE TRIGGERS

BACKGROUND

Master Information Block (MIB) and System Information Blocks (SIBs) contain information needed for user equipment (UE) to operate in a cellular network (e.g., in an NR, LTE, WCDMA radio access network). The MIB carries information needed for a UE to acquire other information from the cell. For example, in NR, the MIB includes necessary parameters required to decode the first SIB (SIB Type 1, SIB1); SIB1 carries information needed to evaluate if a UE can access a cell and defines the scheduling of other system information essential for the operation of the UE; SIB2 carries cell re-selection information common for intra-frequency, inter-frequency and/or inter-RAT cell re-selections; SIB3 carries NR intra-frequency neighbor cell list and reselection criteria; SIB4 carries NR inter-frequency neighbor cell list and reselection criteria; SIB5 caries E-UTRAN (LTE) neighbor cell list and reselection criteria; etc.

Cell reselection procedures are used to change the cell that the UE is camped on after the UE goes into IDLE mode. This allows the UE to re-camp on a cell that has the best radio conditions among the cells that the UE is allowed to camp on. Cell reselection is based on (1) priority levels: For example, in LTE cell re-selection uses priority based levels from 0 to 7 (e.g., included in SIBs or RRC Connection Release messages) where Priority 0 is lowest and Priority 7 is highest; (2) radio link quality: For example, based on RSRP/RSRQ levels, SrxLev of the serving cell (cell selection receive level value in dB measured by UE), SintraSearch (threshold value for intra-frequency measurements), SnonintraSearch (threshold value for inter-frequency and inter-RAT measurements), etc.; and (3) cell accessibility. Additional details on IDLE mode cell reselection can be found in, for example, 3GPP TS 38.304 & 36.304 (UE procedures in idle mode); TS 38.311 & 36.311 (RRC protocol specification); and other 3GPP standard docs.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the disclosed technology, systems and methods for dynamically assigning cell reselection priorities (e.g., system information block (SIB) priorities) to different layers for radio cells experiencing performance degradation are disclosed. The default SIB priorities of the degraded layers (e.g., frequency bands or radio access technologies (RATs) experiencing performance degradation or anomalous operation) are downgraded based on the severity of the performance degradation. For example, for critical performance degradations, the SIB priority can be set to the lowest variable SIB priority and all other priorities incremented by a priority level.

The updated SIB priorities are broadcast to user equipment (UEs) to allow the UEs to perform cell reselection based on the updated SIB priorities (e.g., deprioritize layers with degraded performance that otherwise have a high default SIB priority).

The SIB priorities can be further adjusted (and re-transmitted to the UEs) based on changes in the layers that are degraded or on the severity of the performance degradation (e.g., if performance degradations are partially resolved reducing the severity of the degradation or if the degradation becomes worse). When the performance degradation is completely resolved, the SIB priorities revert to the default SIB priorities.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
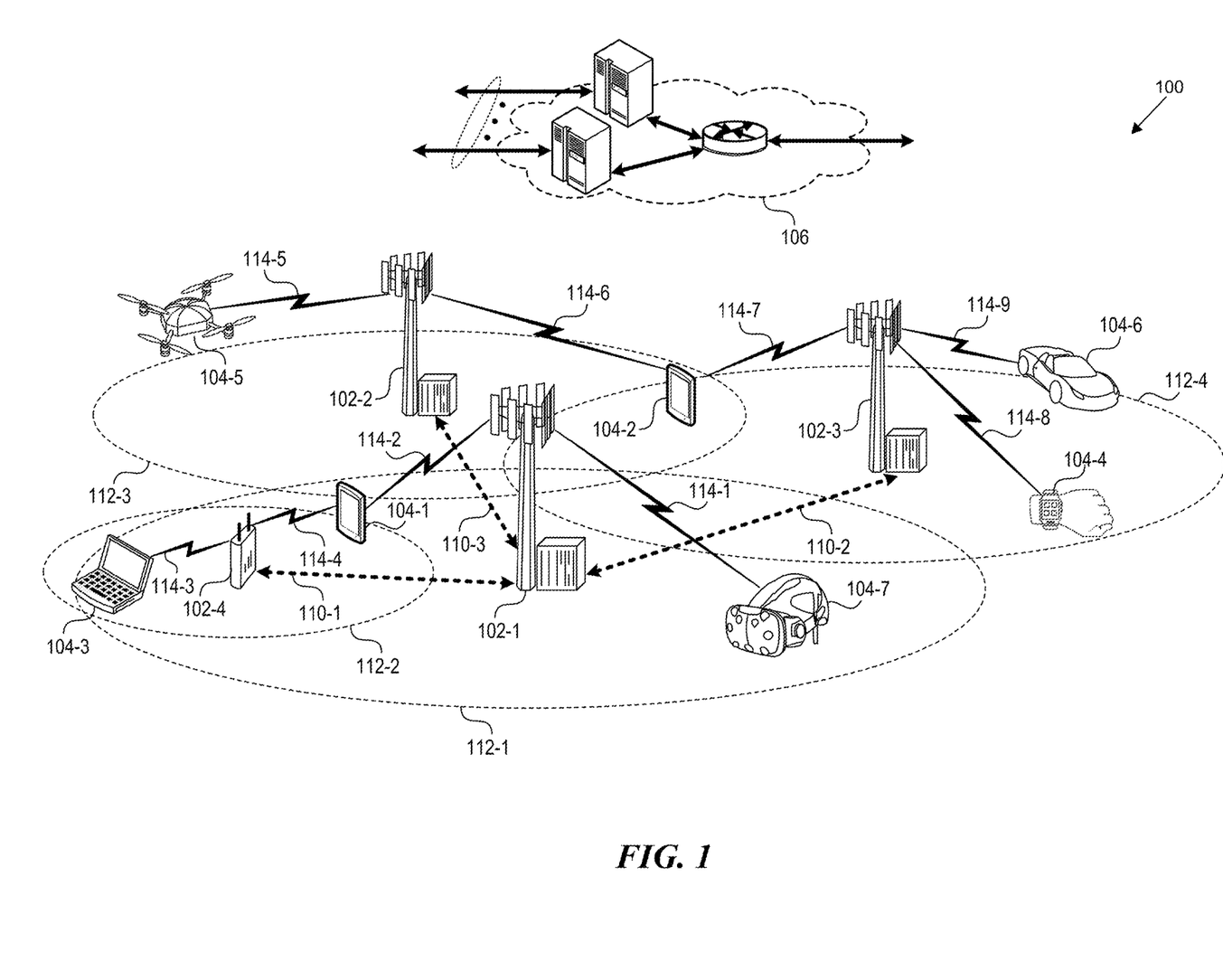
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
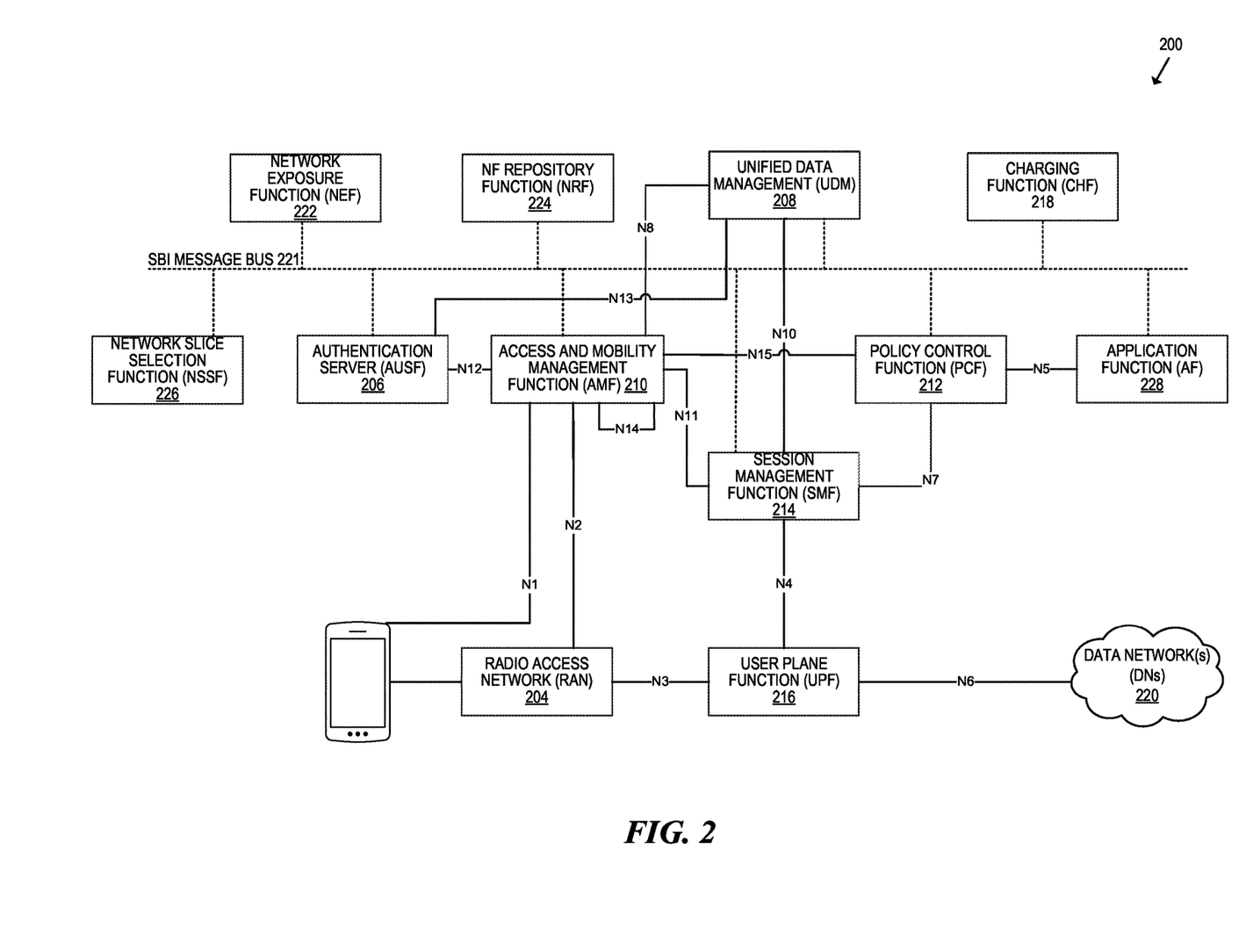
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Assigning SIB priorities

Figure 3:
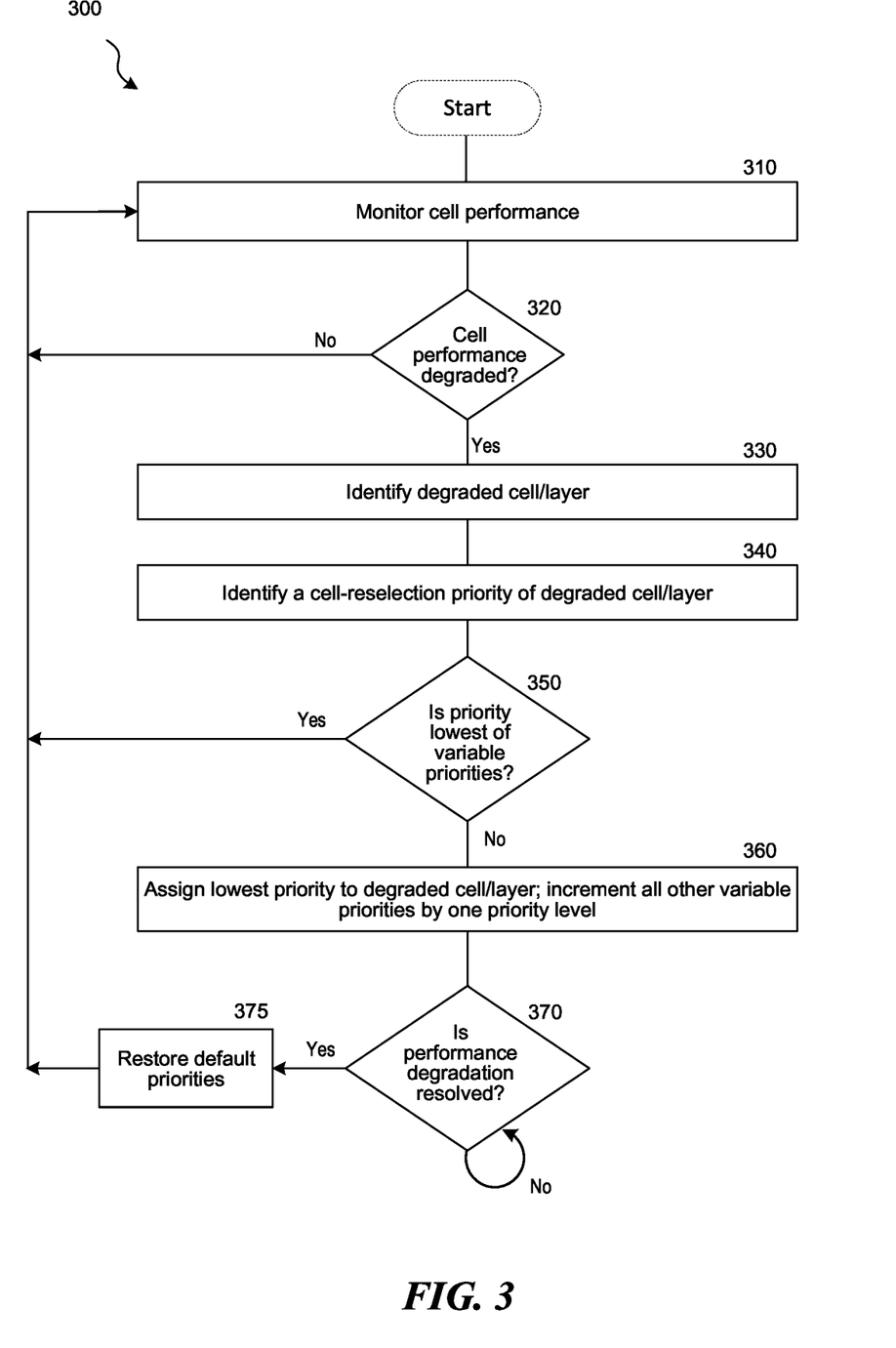
FIG. 3 is a flowchart that illustrates a process for dynamically assigning cell-reselection priorities based on performance degradation.

FIG. 3 is a flowchart 300 that illustrates a process for dynamically assigning cell-reselection priorities (e.g., SIB priorities) based on performance degradation. After initial cell search and cell selection, when a UE goes into IDLE mode, the UE measures RSRP/RSRQ for the cell it is camped to and performs cell reselection based on the RSRP/RSRQ and the relative priorities of the layers (e.g., frequency bands and RATs) that the UE is compatible with.

Because conventional SIB priorities are static, the UE could stay camped in the cells or layers with the default high priority even when the layers are experiencing performance issues (e.g., intermittent hardware or software issues) unless those layers are unavailable, e.g., cell powered down or the RF conditions is substantially degraded. There is therefore a need for a system and methods to dynamically assign SIB priorities to improve user experience in such situations.

At block 310, a system or network node in the wireless telecommunication network 100 (e.g., an eNB or gNB such as base stations 102) monitors the performance of radio cells in the network for performance degradation or anomalies (e.g., eNB/gNB monitors defined triggers on cell/bands across all defined radio access technologies). The monitoring can be part of existing operation support systems (OSS) monitors. For example, the OSS system can monitor and detect cell outage and network degradation by monitoring performance counters, key process indicators (KPIs), alarms, sleeping cell failures, accessibility issues due to tunneling or ducting or other external interference triggers, or any other process or system in the network for detecting anomalous network operation (e.g., in network equipment or base station equipment like baseband unit, radio unit, etc.).

Example of KPI triggers that can indicate cell/layer performance degradation include if radio access channel (RACH) setup attempts is degraded below a defined threshold; if radio resource control (RRC) connection setup attempts are degraded below a defined threshold; if RRC success rate is lower than a defined threshold; if an S1 setup success rate is degraded below a defined threshold; etc.

Example of Alarm triggers or alarm active indications that can indicate that the cell or layer performance is degraded can include general alarms such as a "Cell Operation Degraded" alarm. In some implementations, for certain alarms to cause the Alarm trigger at block 320, the alarm needs to stay active for a defined time (e.g., a cell operation degradation alarm staying active for more than a predefined threshold of time). Different types of alarms can have different threshold times before they cause the Alarm trigger (e.g., critical alarms can have a shorter threshold time than non-critical alarms; alarms indicating typically intermittent failures modes can require a longer threshold time, etc.).

Sleeping cell failures can render network services unavailable sometimes without causing anomalous KPIs or triggering alarms. For example, the sleeping cell failure can result from a RACH failure due to RACH misconfiguration, or software/firmware failure at the eNB/gNB leading to an inability of the cell to serve any new users while continuing to serve existing users (until at least a UE requires cells reconfiguration or new timing advance). In other sleeping cell failures, the cell can be completely locked up and unable to handle any traffic. The sleeping cell condition trigger can be based on monitoring various parameters such as cell availability, call attempts, RACH setup attempts, E-UTRAN Radio Access Bearer (E-RAB) setup attempts, downlink (DL) traffic volume, comparison of successful establishment of additional E-RABs with certain QCI/5QI at different times, traffic trends, alarm history, tickets (e.g., customer complaint tickets or other trouble tickets), etc.

Tunneling or ducting (tropospheric ducting, tropo-ducting) can cause over-shooter cells that overshoot to distant cells when radio waves from cells designed to serve one market area or region travel substantial distances (e.g., 100s of miles) through an atmospheric duct (e.g., radio signals travel past first tier neighbor cells). Tropo-ducting is commonly seen near large water bodies and typically occur seasonally following the local weather patterns, for example, when warm moist air is "trapped" close to ground and up to around 5000 feet. Tropo-ducting can repeat seasonally at similar times during the day and can last from minutes to hours. For example, for "ducted" TDD cells, DL signals from one tower can travel far and arrive during a distant cell's uplink (UL) time causing interference to a distant UE. In addition to the UE interference based degradation caused by tropospheric ducting leading to UE signal quality degradation, tropospheric ducting also leads to a limited cell/subscriber throughput, reduced cell coverage area, and increased call drops, failures which all lead to degraded customer experience. The disclosed technology allows the network to monitor for layers experiencing ducting and downgrade the SIB priorities of those layers as described below.

At block 320, if the network (e.g., eNB/gNB or other network node or system) does not detect degraded cell performance, it continues to monitor the cell performance.

However, if at block 320 the network detects degraded performance, the network, at block 330, can identify the degraded cell and/or degraded layer. The "layer" as used in this description can mean one or more frequency bands (e.g., LTE or NR frequency bands); a radio access technology (RAT) such as GSM, CDMA2000, UMTS/WCDMA, LTE, or NR; etc.

At block 340, the network identifies a cell-reselection priority of the degraded cell or layer. Because the cell-reselection priorities of different frequencies within the same or different RATs are typically provided to the UE in system information (SI) messages carried in system information blocks (SIBs) (e.g., in SIB3 cellReselectionPriority Information Element (IE)), cell-reselection priorities throughout this description are interchangeably referred to as "SIB priorities." In the case of SI messages, an NR/LTE frequency or inter-RAT frequency can be listed without providing a priority (e.g., the field cellReselectionPriority is absent for that frequency).

In some implementations, the UE perform cell reselection evaluation only for LTE/NR frequencies and inter-RAT frequencies that are given in SI messages and for which the UE has a priority provided; in other implementations, frequencies with no priority provided are considered as having a lowest priority or the variable priority levels. In some implementations, equal priorities between RATs are not supported.

Cell-reselection priorities can also be communicated to the UE in RRC Release messages, or by inheriting from another RAT at inter-RAT cell (re)selection. The cell-reselection priorities can be contained in different forms and formats at the network node (e.g., eNB/gNB) before they are assembled into SIB SI messages for broadcast to the UE.

Figure 5:
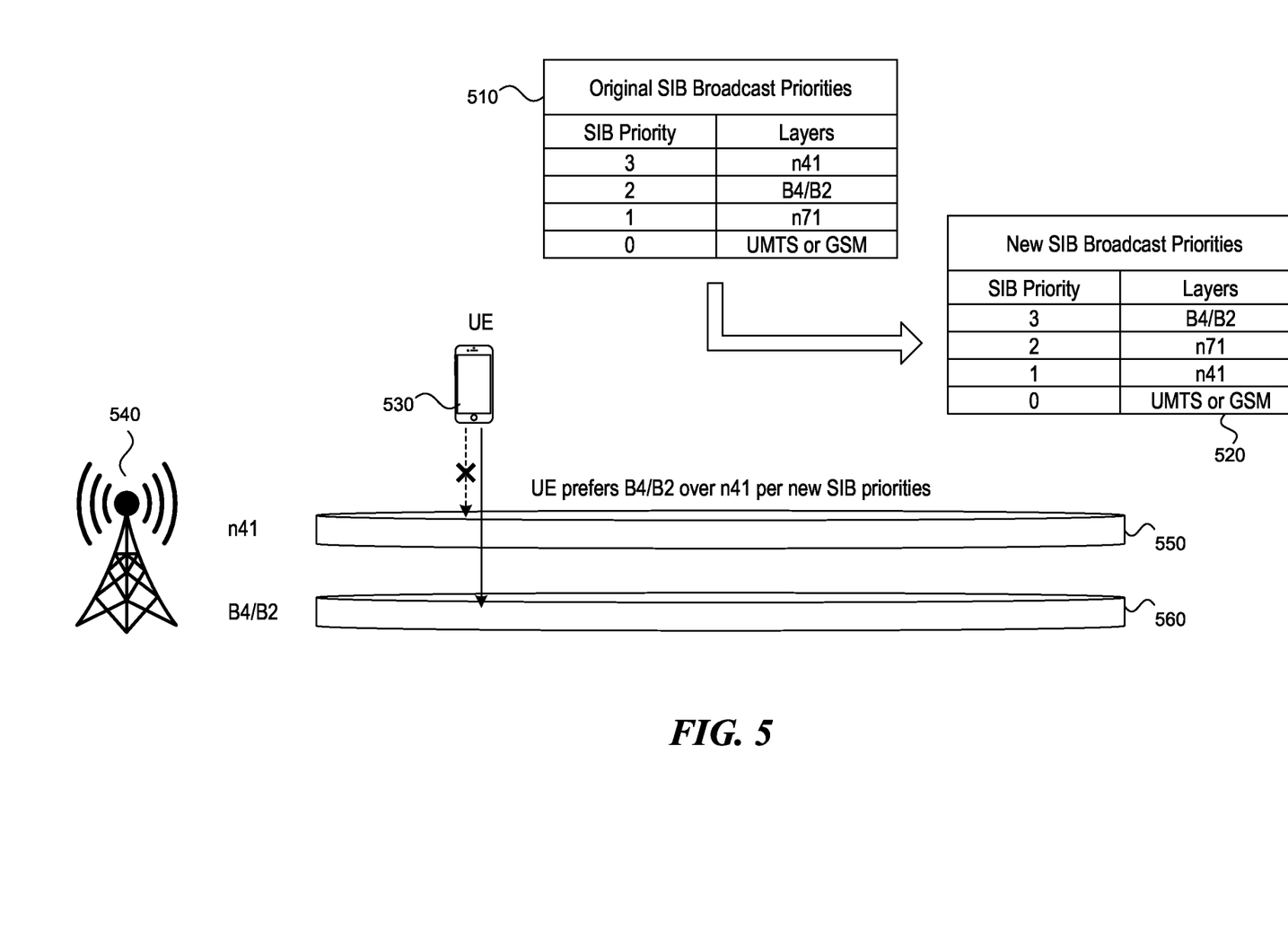
FIG. 5 is a block diagram that illustrates an example of assigning SIB priorities.

An example of SIB priorities can be seen in Table 510 in FIG. 5. A higher numeric priority indicator value indicates a higher priority than a lower value. For example, in Table 510 of FIG. 5, the layer corresponding to NR band n41 has a SIB priority numeric value of 3 indicating that it is the highest priority layer of the layers in Table 510; the UMTS or GSM RAT has a SIB priority of 0 indicating that it is the lowest priority layer of the layers in Table 510.

It will be appreciated that, although the functions described above with respect to block 310, 320, 330, and 340 appear in different blocks, these are not necessarily sequential steps or need not be distinct processes or functions. For example, a network node or system that detects degraded cell performance or a degraded layer can identify the problematic cell or layer as part of the performance degradation detection (e.g., the eNB/gNB could immediately determine that a certain frequency band is failing RACH setup attempts, or a that a certain cell serving a specific RAT is experiencing a sleeping cell failure).

At block 350, the network determines if the degraded layer already has the lowest priority of the variable or modifiable priorities. If the degraded layer does not already have the lowest priority, the network at block 360 assigns the lowest priority to the degraded cell or layer and increments all other variable priorities by one priority level.

For example, turning to FIG. 5, if the network determines that the layer corresponding to NR band n41 has degraded performance (e.g., KPI trigger, alarm trigger, cell serving band n41 in sleeping cell state, etc.), the network can assign a cell-reselection or SIB priority of 1 to band n41 as shown in Table 520. That is, the network can deprioritize the band n41 priority from the highest priority with a priority indicator value of 3 to the lowest variable priority with a priority indicator value of 1 (e.g., where the priority indicator value of 0 indicates a non-variable or non-modifiable priority value hence NR band n41 would never have a lower priority than UMTS/GSM in the example of FIG. 5). The network updates the SIB priorities of other layers by one priority level, for example as seen in Table 520, the priority of layer corresponding to LTE band B4/B2 is incremented from 2 to 3, and the layer corresponding to NR band n71 has is incremented from 1 to 2. Deprioritizing band n41 instead of turning off or otherwise disabling the operation of the band n41 cell can be more optimal (e.g., lead to better capacity utilization) especially for minor performance degradations.

Turning back to FIG. 3, if at block 350 the network determines that the degraded layer already has the lowest priority of the variable or modifiable priority levels, the network determine that it cannot deprioritize or downgrade the SIB priority further and continues to monitor the cell performance at block 310.

The network (e.g., eNB/gNB) transmits the updated (e.g., downgraded or deprioritized) cell reselection priority to the UE in system information messages (SI messages) of SIBs just as it broadcasts the default cell-reselection priority before any cell/layer performance degradation is detected. The SIB priority or cell-reselection priority assigns a priority indicator value to one or more layers that the UE is compatible with (e.g., to one or more frequency bands, RATs, CA/DC frequency combinations, etc., that the UE supports). The updated cell-reselection priority assigns a lower priority indicator value then the default priority indicator value to the layer(s) undergoing a performance degradation thereby causing the IDLE mode UE to deprioritize those layers experiencing poor performance (e.g., if RSRP/RSRQ is low, the UE searches for a higher priority layer to camp on avoiding the layers with poor performance). In some implementations, the UE searches for the higher priority layer as soon as possible after receiving the change of priority.

In some implementations, the network also communicates the anomalies or the updated SIB priorities to co-located nodes (e.g., co-located cells in the same site) or to neighbor cells (e.g., first tier neighbors depending on the spatial extent of the anomalies).

The eNB/gNB communicates with neighbor cells, for example, via the X2 interface. Additionally or alternatively, in self-optimizing networks (SON), network operators could schedule/run a SON module on nodes periodically to embed the information on anomalies or SIB priorities. In some implementations, the communication to neighbor cells can be based on the network topology. For example, in a highway, cells along the highway can be notified of the anomalies or SIB priority adjustments because a vehicle traveling on the higher will eventually try to camp on those cells; in residential neighborhood, cells a certain radius around the problematic cells could be notified of the issues, etc.

Communicating the performance degradations and/or the modified SIB priorities to neighbor cells can avoid the UEs camping on a neighbor cell that might be undergoing the same performance degradation (e.g., prevent cell-edge users from attaching to problematic cells). For example, the same anomalies might exist in neighbor cells but performance triggers in neighbor cells might still be below defined trigger thresholds which can cause ping-pong among neighbor cells if the anomalies are intermittent and persist for a long duration.

At block 370, the network determines if the cell performance degradation is resolved (e.g., the KPIs are back to normal based on pre-defined restoration timer, alarm is off, or sleeping cell failure is resolved such as by a reboot or power cycling of the cell equipment). If the performance degradation is resolved, the network at block 375 restores the default or original SIB priorities and transmits/broadcasts the default SIB priorities to the UEs such that the UE will prioritize layers based on the default SIB priorities. Conversely, if the cell performance degradation is not resolved, the UE continues to perform cell reselection based on the modified or updated SIB priorities.

Assigning SIB Priorities Based on Severity

Figure 4:
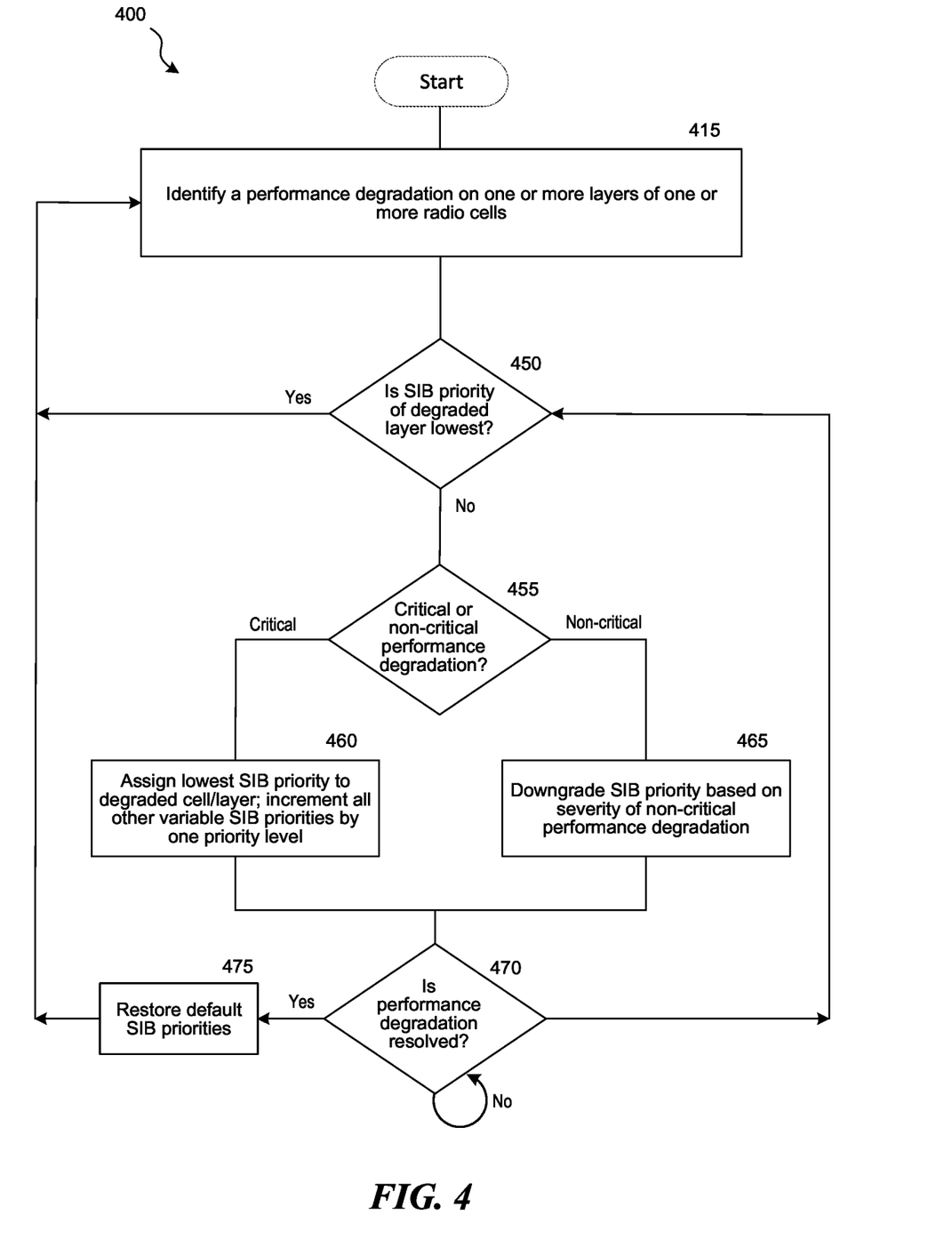
FIG. 4 is a flowchart that illustrates a process for dynamically assigning cell-reselection priorities based on severity of performance degradation.

FIG. 4 is a flowchart 400 that illustrates a process for dynamically assigning cell-reselection priorities (e.g., SIB priorities) based on severity of performance degradation. At block 415 the network (e.g., eNB, gNB, or other network node) identifies a performance degradation on one or more layers of one or more radio cells. For example, the eNB/gNB can determine that cell performance degradation affects one or more frequency bands or one or more RATs (e.g., via KPIs, alarms, counters, etc.) and determines the cell-reselection priorities or SIB priorities corresponding to those layers (e.g., as described above in relation to blocks 310-340 of FIG. 3).

At block 450, the network determines if the degraded layer already has the lowest cell-reselection priority (lowest SIB priority). Where the performance degradation affects multiple layers, the network determines if each of the degraded layers has the lowest SIB priority). If the degraded layers have the lowest SIB priority, no additional de-prioritization can be made and the network continues to monitor for performance degradation at block 415.

At block 455, the network determines if the performance degradation corresponds to a critical or non-critical performance degradation and the severity of the performance degradation or anomaly.

At block 460, if the performance degradation is critical (e.g., the severity of the anomaly corresponds to a highest severity), the network assigns the lowest SIB priority to the degraded layer and increments all other variable or modifiable SIB priorities by one priority level as described above in relation to block 360 of FIG. 3.

At block 465, if the performance degradation is non-critical (e.g., the anomaly is not of the highest severity), the network downgrades or deprioritizes or otherwise adjusts/updates the SIB priorities of the degraded layers based on the relative severities of the performance degradation. Layers with worse or more severe performance degradation are assigned a lower cell-reselection priority than layers that have only minor performance degradation. Degraded layers that originally had the same SIB priority could be assigned different SIB priorities based on the relative severities of the anomalies.

In addition to adjusting the priority indicator values of the degraded layers based on the severity of the performance degradation, the priority indicator values of the layers without any performance degradation are also adjusted based on the priority indicator values assigned to the degraded layers. For example, if only one layer is degraded and is assigned to the lowest variable priority value, the priority value of the rest of the layers is incremented by one level. If on the other hand, the layer degradation is only minor such that the priority value is not set to the lowest level, the layers with a lower priority value than the assigned value will remain with the same priority value but the layers with an equal or greater priority value will increment the priority value by one level.

Tables 1A-1C below illustrate examples of how SIB priorities can be adjusted in some representative implementations. In the example of Table 1A, two layers corresponding to NR band n41 and n71 are undergoing performance degradation. Band n71 with the worst degradation (critical degradation) is assigned the lowest variable priority value of 2, but band n41 has only minor degradation so it is assigned a SIB priority level of 4. This can be because the network operator determined that the type of performance degradation experienced by band n41 is minor enough that band n41 should still be assigned a higher cell-reselection priority than band B12 in such cases. As can be seen in Table 1A, for this example priority assignment, the SIB priorities of Bands B4, B2, B12 are incremented by one priority level.

If, as shown in Table 1B, the SIB priority of band n41 had instead been assigned to priority level 3 (e.g., the "minor" degradation is serious enough that the n41 SIB priority is set below the B12 SIB priority), the priority level of B12 would be incremented by two priority levels.

Conversely, if band n71 was not degraded as shown in Table 1C, and if it was determined that the degradation in band n41 was so minor that the SIB priority should only be downgraded from priority level 6 to priority level 3, the SIB priority of B12 would not change and the layers corresponding to n71, B2, and B4 would increment by one priority level. In Tables 1A-1C, the SIB priorities of the UMTS and GMS RATs is not changed because SIB priority 1 and 0 has been set as non-variable/non-modifiable in these examples.

TABLE 1A

| SIB Priority | Layer (Frequency or RAT) | Severity of Degradation | Layer with Adjusted SIB Priority |
| --- | --- | --- | --- |
| 6 | n41 | Minor degradation | B4 |
| 5 | B4 | Not degraded | B2 |
| 4 | B2 | Not degraded | n41 |
| 3 | n71 | Critical; Worst Degradation | B12 |
| 2 | B12 | Not degraded | n71 |
| 1 (not variable) | UMTS | Not degraded | UMTS |
| 0 (not variable) | GSM | Not degraded | GMS |

TABLE 1B

| SIB Priority | Layer (Frequency or RAT) | Severity of Degradation | Layer with Adjusted SIB Priority |
| --- | --- | --- | --- |
| 6 | n41 | Minor degradation | B4 |
| 5 | B4 | Not degraded | B2 |
| 4 | B2 | Not degraded | B12 |
| 3 | n71 | Critical; Worst Degradation | n41 |

TABLE 1B-continued

| SIB Priority | Layer (Frequency or RAT) | Severity of Degradation | Layer with Adjusted SIB Priority |
| --- | --- | --- | --- |
| 2 | B12 | Not degraded | n71 |
| 1 (not variable) | UMTS | Not degraded | UMTS |
| 0 (not variable) | GSM | Not degraded | GMS |

TABLE 1C

| SIB Priority | Layer (Frequency or RAT) | Severity of Degradation | Layer with Adjusted SIB Priority |
| --- | --- | --- | --- |
| 6 | n41 | Minor degradation | B4 |
| 5 | B4 | Not degraded | B2 |
| 4 | B2 | Not degraded | n71 |
| 3 | n71 | Not degraded | n41 |
| 2 | B12 | Not degraded | B12 |
| 1 (not variable) | UMTS | Not degraded | UMTS |
| 0 (not variable) | GSM | Not degraded | GMS |

A network operator can assign different severity indicators to different types of anomalies. For example, an operator can define that anomalies that cause voice calls to be dropped or other degradations below a certain threshold level to be critical. The operator could also define different severity levels based on performance degradation threshold levels. For example, a layer with a RACH setup attempt below threshold A but above threshold B, could have a worse severity level than a layer with a RACH setup attempt below threshold B, where threshold A is above threshold B (e.g., if it were determined that RACH setup attempts below threshold B led to a worse user quality of experience than RACH setup attempts between thresholds A and B). The operator can also define absolute thresholds to cause SIB de-prioritization. For example, if SIB setup attempts is degraded by 30%, trigger SIB de-prioritization but otherwise do nothing; SIB setup attempts lower than 30% have worse severity (and hence lower priority downgrade) than RRC connection setup attempts lower than 30%, etc.

The network operator can also assign severity levels or designate anomalies as critical or non-critical based on the length of time the anomaly has been present or the typical time it takes for the anomaly to resolve (e.g., the time it takes for the anomaly to resolve itself such as in a self-healing or self-optimizing network or other network with automated failure recovery, or the time it takes for technicians to resolve the problem). For example, anomalies that have been present for a long time or that typically take long to resolve could be assigned a lower SIB priority than anomalies that typically resolve quickly.

Examples of critical anomalies can include sleepy cell failure for a prolonged duration; RF module failure alarms; voltage standing wave ratio (VSWR) major alarms; software corrupted alarms; RF module out of order alarms; critical bit error rate (BER) detected on the optical connection to radio module; baseband failure; etc.

Examples of non-critical anomalies can include intermittent sleepy cell failures; VSWR minor alarms; cell degraded performance alarms; high intermittent interference; missing reference GPS/clock source; TX/RX out of order alarms; deteriorated transmission quality alarms; increased BER detected on the optical connection to radio module; etc.

In some implementations, even when the SIB priority of all the degraded layers correspond to the lowest SIB priority in block 450, the network can modify the relative SIB priorities of the degraded layers based on the severity of the degradation. That is, a layer with performance degradation could have its SIB priority increased instead of decreased because other layers have worse performance degradation. For example, if radio access network has only three layers and the two layers with the lowest SIB priorities are degraded (e.g., two out of three available frequency bands are experiencing connection issues), if one layer has a degradation that is more severe than the other layer (e.g., results in a worse user quality of experience) the layer with the worst degradation could remain with the lowest SIB priority (e.g., layer with worst degradation remains as SIB priority=0) and the network could increase the priority of the other degraded layer above the lowest priority but below the priority of the layer without any issues (e.g., layer with less worse degradation increased to SIB priority=1 and layer with no degradation remains or gets set to SIB priority=2 or more).

In some implementations, instead of determining if the performance degradation is critical or non-critical, the network at block 455 determines the severity of the performance degradation and downgrades the SIB priority of degraded layers in block 465 based on the severity of the performance degradation whereby the layer with the most severe performance degradation (which can correspond to a critical degradation) is assigned the lowest SIB priority as described above in relation to block 460.

At block 470, the network determines if the performance degradation is resolved (e.g., KPIs back to normal and alarms off for a certain duration). If performance is back to normal, the network reverts to the default SIB priorities and continue to monitor for performance degradations at block 415. If performance is still degraded, the network continues to broadcast the SIB priorities as described above.

If the performance degradation on some layers is completely or partially resolved but there are still some degraded layers, the network can readjust SIB priorities based on the new relative severities and relative priorities of the layers. That is, the network can further adjust the cell-reselection priority of the layers, including the degraded layers, in response to determining that some but not all of the performance triggers no longer indicate a performance degradation or in response to a change in relative severity of the performance degradation triggers (e.g., performance degradation in some layers partially fixed or gets worse such as when counters indicate that performance has fallen below a lower performance threshold). For example, the network can determine at block 455 if the remaining anomalies are critical or non-critical and downgrade/adjust the SIB priorities based on the severity of the degradations in block 465.

For example, in Table 1C above, the anomalies in band n71 that were previously critical are resolved but there are still minor issues with band n41 leading to the adjustment of the SIB priorities as depicted in Table 1C. If, on the other hand, the critical degradation of band n71 were not completely resolved but partially resolved to a minor degradation, the SIB priorities could adjust based on the relative severity of the unresolved issues. Additionally, if the minor anomalies in band n41 were resolved, the SIB priorities would revert to the default SIB priorities.

FIG. 5 is a block diagram that illustrates an example of assigning SIB priorities. Table 510 depicts an example of default SIB broadcast priorities for a multi carrier network operator with different carrier frequency bands and different RATs. The network operator can determine the default SIB priorities based on various considerations on how to load their network such as based on the channel bandwidth of the different bands (e.g., the highest channel bandwidth for NR band n41 or LTE band B41 is given highest re-selection priority); different market considerations (e.g., promotions of LTE/NR network over UMTS/GSM results in LTE/NR RATs having higher priority that UMTS/GSM RATs); network slice and application considerations (e.g., certain IoT devices requiring enhanced coverage could have SIB configurations that prioritize low frequency bands like LTE B71 or NR n71 at 600 MHz over other higher frequency bands like B41/n41 at 2.6 GHz or NB-IoT could have its own SIB priority while LTE and LTE-M could have the same SIB priorities); etc. The network operator can also define a range of variable SIB priorities that can be modified and range of priorities that cannot be modified.

A UE that supports NR band n41 and measures the layer better than, for example the defined QrxLevmin (the minimum RSRP values measured by the UE in a cell to be able to get unrestricted coverage-based service in that cell), attempts to attach to that cell. If the n41 layer is exhibiting active critical performance issues like sleepy cell, and thus resulting in degraded experience or not allowing UEs to connect, the UE could still continue to attempt to connect to the n41 layer of the cell due to its highest SIB priority.

The disclosed technology allows the network (e.g., eNB/gNB) to broadcast new SIB priorities reflecting a lower priority for such degraded layers as shown in Table 520. For example, the network can deprioritize band n41 by assigning it the lowest variable numeric priority indicator value of 1 (from the highest priority indicator value of 3). The SIB priority of other layers can be incremented by one, for example as seen in Table 520, the layer corresponding to LTE band B4/B2 now has a SIB priority indicator value of 3 (increased from 2), and the layer corresponding to NR band n71 has a SIB priority indicator value of 2 (increased from 1).

In the example, of FIG. 5, the UMTS/GSM RAT layer is assigned a fixed/non-variable/non-modifiable priority value of 0. Consequently, although NR band n41 is experiencing poor performance, it has a higher reselection probability than UMTS/GSM RATs, all else equal (e.g., setting aside reselection probability based on RF radio performance).

A UE 530, e.g., a new incoming UE such as a UE in initial acquisition or initial cell search, or a UE in IDLE mode going through cell-reselection will receive SI messages with the new SIB priorities from base station 540 and will prioritize LTE B4/B2 560 over NR n41 550. The disclosed technology thereby allows the UE 530 to always be connected to the most optimal layer by dynamically adjusting SIB priorities to allow the UE to prioritize higher performance layers over layers with degraded performance even when the degraded performance layers by default have higher SIB priorities (e.g., because of wider bandwidth or generally higher performance/capacity). With such updated priorities, new upcoming UEs attempt to connect with highest priorities to layers like Band-4 or Band-2 and get better experience than if they tried to connect to band n41.

Computer System

Figure 6:
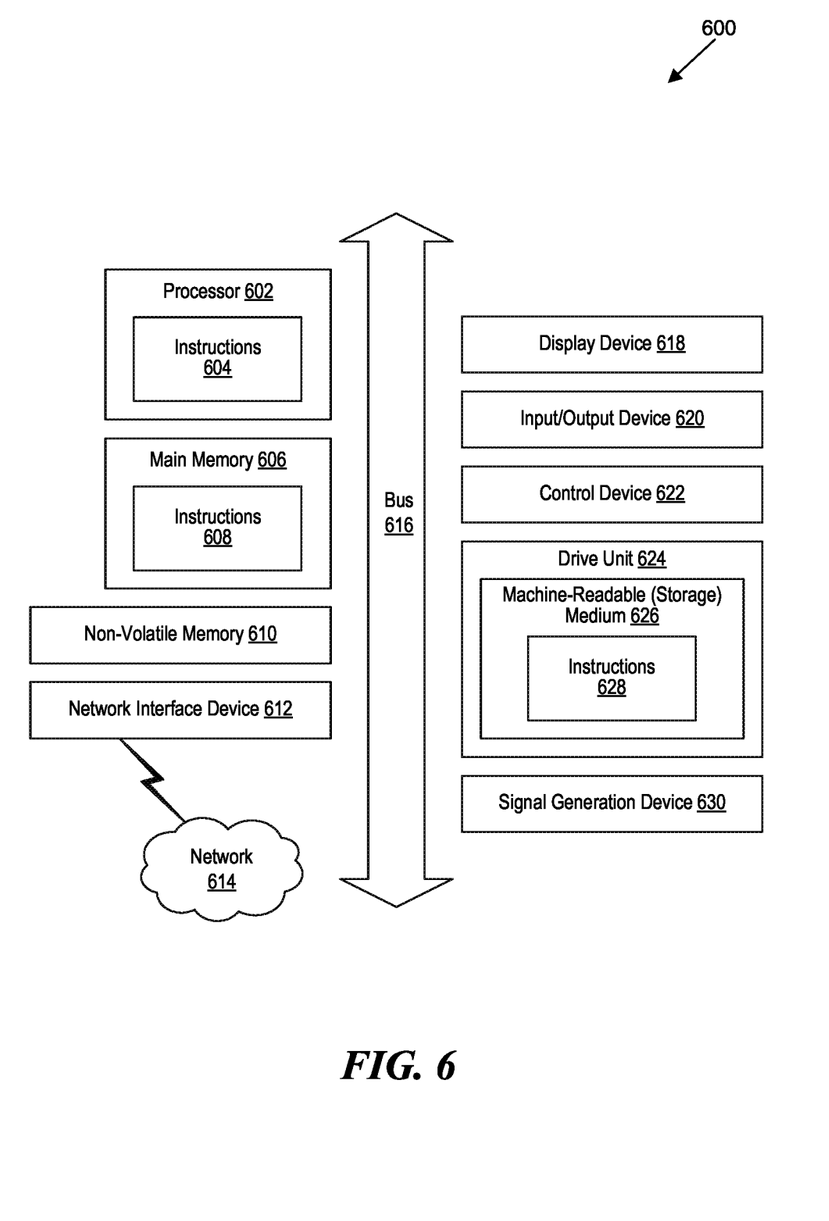
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a system, cause the system to:
   monitor a radio cell for one or more performance triggers,
      wherein the one or more performance triggers comprise a key process indicator (KPI) trigger, an alarm trigger, or a sleeping cell condition trigger;
   identify a degraded layer in response to determining that a performance trigger of the one or more performance triggers indicates that a cell performance is degraded,
      wherein the degraded layer comprises a degraded frequency band or a degraded radio access technology (RAT);
   identify a cell-reselection priority of the degraded layer,
      wherein the cell-reselection priority comprises a priority indicator value contained in one or more system information (SI) messages or one or more radio resource control (RRC) messages;
   downgrade the cell-reselection priority of the degraded layer in response to determining that the priority indicator value of the degraded layer does not indicate a lowest cell-reselection priority; and
   restore the cell-reselection priority of the degraded layer to a default priority in response to determining that the performance trigger indicates that the cell performance is no longer degraded.

2. The at least one computer-readable storage medium of claim 1,
   wherein the KPI trigger comprises a radio access channel (RACH) setup attempt degradation, a radio resource control (RRC) connection setup attempt degradation, an RRC success rate degradation, or an S1 setup success rate degradation, and
   wherein the alarm trigger comprises a cell operation degradation alarm staying active for a defined time.

3. The at least one computer-readable storage medium of claim 1, wherein downgrading the cell-reselection priority of the degraded layer comprises:
   assigning, to the degraded layer, a priority indicator value indicative of a lowest cell-reselection priority and incrementing, by a priority level, priority indicator values of other layers having a variable cell-reselection priority.

4. The at least one computer-readable storage medium of claim 1, wherein downgrading the cell-reselection priority of the degraded layer comprises:
   when the cell performance comprises a critical performance degradation, assigning, to the degraded layer, a priority indicator value indicative of a lowest cell-reselection priority and incrementing, by a priority level, priority indicator values of other layers having a variable cell-reselection priority; and
   when the cell performance comprises a non-critical performance degradation, assigning, to the degraded layer, a priority indicator value based on a severity of the non-critical performance degradation and adjusting priority indicator values of one or more other layers based on the priority indicator value assigned to the degraded layer.

5. The at least one computer-readable storage medium of claim 1, wherein the system is further caused to:
   transmit the downgraded cell-reselection priority to a user equipment (UE) thereby causing the UE to search for a higher priority layer to camp on.

6. The at least one computer-readable storage medium of claim 1, wherein the system is further caused to:
   transmit the downgraded cell-reselection priority or the performance trigger to one or more neighbor radio cells.

7. A computer-implemented method, comprising:
   monitoring a radio cell for one or more performance triggers,
      wherein the one or more performance triggers comprise a key process indicator (KPI) trigger, an alarm trigger, or a sleeping cell condition trigger;
   identifying a degraded layer in response to determining that a performance trigger of the one or more performance triggers indicates that a cell performance is degraded,
      wherein the degraded layer comprises a degraded frequency band or a degraded radio access technology (RAT);
   identifying a cell-reselection priority of the degraded layer,
      wherein the cell-reselection priority comprises a priority indicator value contained in one or more system information (SI) messages or one or more radio resource control (RRC) messages;
downgrading the cell-reselection priority of the degraded layer in response to determining that the priority indicator value of the degraded layer does not indicate a lowest cell-reselection priority; and
restoring the cell-reselection priority of the degraded layer to a default priority in response to determining that the performance trigger indicates that the cell performance is no longer degraded.

8. The computer-implemented method of claim 7,
wherein the KPI trigger comprises a radio access channel (RACH) setup attempt degradation, a radio resource control (RRC) connection setup attempt degradation, an RRC success rate degradation, or an S1 setup success rate degradation, and
wherein the alarm trigger comprises a cell operation degradation alarm staying active for a defined time.

9. The computer-implemented method of claim 7, wherein downgrading the cell-reselection priority of the degraded layer comprises:
assigning, to the degraded layer, a priority indicator value indicative of a lowest cell-reselection priority and incrementing, by a priority level, priority indicator values of other layers having a variable cell-reselection priority.

10. The computer-implemented method of claim 7, wherein downgrading the cell-reselection priority of the degraded layer comprises:
when the cell performance comprises a critical performance degradation, assigning, to the degraded layer, a priority indicator value indicative of a lowest cell-reselection priority and incrementing, by a priority level, priority indicator values of other layers having a variable cell-reselection priority; and
when the cell performance comprises a non-critical performance degradation, assigning, to the degraded layer, a priority indicator value based on a severity of the non-critical performance degradation and adjusting priority indicator values of one or more other layers based on the priority indicator value assigned to the degraded layer.

11. The computer-implemented method of claim 7, further comprising:
transmit the downgraded cell-reselection priority to a user equipment (UE) thereby causing the UE to search for a higher priority layer to camp on.

12. The computer-implemented method of claim 7, further comprising:
transmit the downgraded cell-reselection priority or the performance trigger to one or more neighbor radio cells.

13. A system, comprising:
means for monitoring a radio cell for one or more performance triggers,
wherein the one or more performance triggers comprise a key process indicator (KPI) trigger, an alarm trigger, or a sleeping cell condition trigger;
means for identifying a degraded layer in response to determining that a performance trigger of the one or more performance triggers indicates that a cell performance is degraded,
wherein the degraded layer comprises a degraded frequency band or a degraded radio access technology (RAT);
means for identifying a cell-reselection priority of the degraded layer,
wherein the cell-reselection priority comprises a priority indicator value contained in one or more system information (SI) messages or one or more radio resource control (RRC) messages;
means for downgrading the cell-reselection priority of the degraded layer in response to determining that the priority indicator value of the degraded layer does not indicate a lowest cell-reselection priority; and
means for restoring the cell-reselection priority of the degraded layer to a default priority in response to determining that the performance trigger indicates that the cell performance is no longer degraded.

14. The system of claim 13,
wherein the KPI trigger comprises a radio access channel (RACH) setup attempt degradation, a radio resource control (RRC) connection setup attempt degradation, an RRC success rate degradation, or an S1 setup success rate degradation, and
wherein the alarm trigger comprises a cell operation degradation alarm staying active for a defined time.

15. The system of claim 13, wherein the means for downgrading the cell-reselection priority of the degraded layer comprises:
means for assigning, to the degraded layer, a priority indicator value indicative of a lowest cell-reselection priority and incrementing, by a priority level, priority indicator values of other layers having a variable cell-reselection priority.

16. The system of claim 13, wherein the means for downgrading the cell-reselection priority of the degraded layer comprises:
means for assigning, to the degraded layer, a priority indicator value indicative of a lowest cell-reselection priority when the cell performance comprises a critical performance degradation, and incrementing, by a priority level, priority indicator values of other layers having a variable cell-reselection priority; and
means for assigning, to the degraded layer, a priority indicator value based on a severity of the non-critical performance degradation when the cell performance comprises a non-critical performance degradation, and adjusting priority indicator values of one or more other layers based on the priority indicator value assigned to the degraded layer.

17. The system of claim 13, wherein the system further comprises:
means for transmitting the downgraded cell-reselection priority to a user equipment (UE) thereby causing the UE to search for a higher priority layer to camp on.

18. The system of claim 13, further comprising:
means for transmitting the downgraded cell-reselection priority or the performance trigger to one or more neighbor radio cells.

* * * * *